United States Patent Office 2,916,420
Patented Dec. 8, 1959

2,916,420

METHOD OF PRODUCING CITRIC ACID BY FERMENTATION

Leonard B. Schweiger, Elkhart, Ind., assignor to Miles Laboratories, Inc., Elkhart, Ind., a corporation of Indiana No Drawing. Application July 8, 1957
Serial No. 670,390

5 Claims. (Cl. 195—36)

This invention relates to the production of citric acid from carbohydrate-containing materials by submerged vegetative fermentation methods, and more particularly relates to a method of inhibiting certain contaminating effects in the fermentation medium which interfere with citric acid production. This application is a continuation-in-part of my application Serial No. 358,950, filed June 1, 1953, and now abandoned.

Although the sugar-containing media conventionally used in citric acid production by submerged fermentation methods are known to have a high resistance to contamination by most micro-organisms, the same media are conversely recognized as being susceptible to contamination from strains of penicillia and certain yeasts. This immunity to the first form of contamination and susceptibility to the latter is primarily attributable to the low pH of the substrate media which is optimumly from about 2.2 to 2.8.

The major effect of the yeast contamination is in reduced fermentation efficiency resulting from competitive utilization of the sugar in the media by both the yeast and the acid producing mold such as *Aspergillus niger*. However, the presence of penicillia in early of late stages of fermentation has a more absolute effect in that it causes a complete cessation of acid production. Though it is commonly referred to as "staling" of the medium, this inability to yield the prescribed amount of citric acid is not due to change in the medium but appears to be brought about through a parasitic relationship between the contaminant, penicillia, and the fermentative organisms.

Accordingly, it is an object of this invention to eliminate fermentation losses due to penicillia contamination.

It is a further object of this invention to provide a method of preventing the development of penicillia incidentally present in submerged fermentation media undergoing vegetative conversion to citric acid.

A further object of this invention is to eliminate the inhibitory effect of penicillia without altering the growth and physiological activity of fermentative organisms.

These and other related objects are achieved by my invention wherein I have eliminated the undesirable effect of penicillia by inclusion of copper in the fermentation medium at a point in the fermentation process after the growth of the *Aspergillus niger* has reached a stage that is optimum for acid yields. It has been found that, under ordinary circumstances, this optimum growth of *Aspergillus niger* is established between about 40 and 50 hours after commencement of the fermentation, i.e., 40 to 50 hours after inoculation.

In order to illustrate the concepts of my invention in greater detail, reference will be made to experiments and tests on media containing *Aspergillus niger* as the fermentative organism, said media being so constituted as to conform with those optimum conditions set forth in U.S. Patents Nos. 2,492,667 and 2,492,673, and being subjected to fermentation procedures therein described. As is commonly known, certain strains and mutants of *Aspergillus niger* have achieved the widest acceptance in submerged fermentation methods because of their high citric acid producing properties.

To preliminarily establish the inhibitory effects of penicillia, and in order to determine the time required for a definite number of organisms to produce staling of a fermentation medium, decationized corn sugar media were inoculated with various concentrations of penicillia spores at the time when the initial *A. niger* inoculation was made and the following staling effects were noted:

Table I

| Penicillia Spores/Liter | Contamination | Days |
|---|---|---|
| $10^6$ | + | 2 |
| $10^5$ | + | 3 |
| $10^4$ | + | 4 |
| $10^3$ | + | 5 |
| $10^2$ | + | 5 |
| 10 | + | 6 |

+ = Sufficient penicillia growth to alter acid production.

Since a conventional fermentative conversion of a medium normally continues over a period of time of about eight to ten days, it can be seen from Table I that all concentrations of penicillia spores down to as little as ten per liter of the medium caused a staling effect within the course of the fermentation period. Penicillia contamination in all examples was established by microscopic examination, fermentation odor and lack of acid production. As can be seen, the time required for the penicillia to effect a staling or reduction of acid production depended upon the initial concentration of the contaminant spores.

Into decationized corn sugar fermentation media containing these established inhibitory amounts of penicillia spores, I have introduced copper sulfate in various amounts to achieve outstanding results in acid production from the contaminated media as is clearly shown in Table II. The copper concentrations shown therein can be effected by addition to the medium of any copper salt soluble in the fermentation medium such as cupric sulfate, cupric chloride, cuprous chloride, cupric nitrate, cuprous cyanide, cuprous iodide, cupric carbonate, cupric acetate, and the like.

Table II

| Batch No. | Penicillia | | $Cu^{++}$ | | Acidity, g. | Observations [1] | |
|---|---|---|---|---|---|---|---|
| | Spores/liter | Days | p.p.m. | Days | | Contamination | Days |
| 1 | 0 | --- | 0 | --- | 356 | — | 12 |
| 2 | $10^5$ | 2⅔ | 0 | --- | 169 | + | 4½ |
| 3 | $10^4$ | 2⅔ | 0 | --- | 256 | + | 6½ |
| 4 | $10^3$ | 2⅔ | 0 | --- | 254 | + | 7 |
| 5 | 10 | 2⅔ | 0 | --- | 293 | + | 8 |
| 6 | $10^4$ | 2⅔ | 5 | 2⅔ | 391 | — | 12 |
| 7 | $10^4$ | 2⅔ | 25 | 2⅔ | 363 | — | 12 |
| 8 | $10^4$ | 2⅔ | 50 | 2⅔ | 362 | — | 12 |
| 9 | $10^4$ | 2⅔ | 75 | 2⅔ | 353 | — | 12 |
| 10 | $10^3$ | 0 | 50 | 2⅔ | 350 | — | 12 |
| 11 | $10^3$ | 0 | 75 | 2⅔ | 347 | — | 12 |
| 12 | $10^4$ | 0 | 75 | 2⅔ | 338 | — | 12 |
| 13 | $10^4$ | 0 | 50 | 3⅔ | 319 | — | 12 |
| 14 | $10^4$ | 0 | 75 | 3⅔ | 345 | — | 12 |

[1] + = Sufficient penicillia growth to alter acid production. — = No evidence of penicillia growth.

It will be evident from a study of Table II that, in order to achieve comprehensive comparisons, different concentrations of both penicillia spores and copper ions were each added at various stages of cell development and acid production.

The first fermentation charted in Table II established as a standard for comparison an acid production of 356 grams produced from a standard strength medium free of both penicillia spores and copper. To the same type and amount of medium which had undergone fermentative conversion for 2⅔ days, varying amounts of penicillia spores were added as shown in batches 2, 3, 4, and 5, and the effect on acid production and staling time were noted. It can be seen that these four experiments show a somewhat longer time to staling than those experiments tabulated in Table I for the reason that these four were not contaminated during the initial 2⅔ days of fermentation. Under the same circumstances but with amounts of copper varying between 5 and 75 p.p.m. being added simultaneously with the artificial contamination of the medium by penicillia spores, acid production in batches 6 through 9 was greatly increased with no observable contamination of the medium being evident. The same improved acid production and absence of observable contamination in the final medium were noted in batches 10 through 14 wherein artificial contamination by penicillia spores was effected at the onset of fermentation, and wherein copper was introduced after 2⅔ and 3⅔ days.

It is evident from these tabulations that in every fermentation to which ionic copper was added, penicillia did not develop to the point of causing a decrease in acid production. Moreover, those fermentations where contamination was induced, and to which no ionic cooper was added, stopped producing acid completely. In this latter series of fermentations it is to be incidentally noted that ionic copper did not materially affect the acid yields.

The following data further illustrate the present process:

Fermentations were commenced in three commercial-scale citric acid fermentors and portions of the media used therein were withdrawn and placed, respectively, in laboratory fermentors. The media were constituted and the fermentations carried out in accordance with the procedure described in U.S. Patents 2,492,667 and 2,492,673. Copper was added to the commercial-scale fermentors after the optimum growth of the fermenting organism, *A. niger*, had been established and no penicillia contamination resulted. In the corresponding laboratory fermentors, no copper was added; all the latter fermentors became staled, and no acid was produced. These data are set out in Table III below:

*Table III*

| Plant Run No. | Cu++ | | Final Acidity, Percent | Laboratory Control Observations |
|---|---|---|---|---|
| | p.p.m. | hrs. | | |
| 717 | 100 | 72 | 61.0 | Became completely stale. |
| 718 | 100 | 48 | 69.4 | Do. |
| | 100 | 96 | | |
| 770 | 100 | 48 | 70.0 | Do. |

Although the exact mechanism of this selective inhibitory effect of the ionic copper is not known, the data set forth in Tables II and III, above, demonstrate that, once the proper cellular morphology of the *Aspergillus niger* for citric acid production has been established, amounts of copper between about 5 and about 200 parts per million parts of the fermenting medium do not affect the acid producing rate of the fermenting organism, but effectively inhibit the penicillia. I have also found, however, that if copper is added to a fermenting medium at a time prior to about 40 to 50 hours after inoculation, the copper has an adverse effect on acid yields.

In view of these fermentation results in which ionic copper successfully eliminated losses due to penicillia contamination, ionic copper was added to two fully fermented batches which were known to be contaminated and which had lost their acid-producing capability.

*Table IV*

| Fermentor No. | Percent acid at time fermentation became stale | Final percent acid after addition of 25 p.p.m. Cu++ |
|---|---|---|
| 9 | 8.4 | 9.88 |
| 7 | 8.2 | 10.09 |

It can be seen from comparison of the final amount of acid obtained after addition of the ionic copper, as compared with the percent acid in the medium condemned as being incapable of further fermentation, that both of these fermentation media were brought back into production. Inasmuch as the normal acid concentration in a fully fermented medium approximates 10 percent, full utilization of state fermentation media can now be achieved according to the methods of my invention. It will be understood that the data in Table IV are illustrative, and that copper additions throughout the range of 5–200 parts per million parts of the media are effective to revive fermentations made stale by penicillia contamination.

Having thus described my invention, I claim:

1. In the production of citric acid by submerged fermentation with *Aspergillus niger* of a carbohydrate-containing medium, the method of inhibiting penicillia growth and development in said medium which comprises incorporating into said fermentation medium, after development of the proper cellular morphology of the *Aspergillus niger* for production of citric acid, ionic copper in amounts between about 5 and about 200 parts per million parts of fermentation medium.

2. In a process for the production of citric acid by the submerged fermentation with *Aspergillus niger* of a carbohydrate-containing medium, the method of inhibiting penicillia growth and development in said medium which comprises incorporating into said fermentation medium, after from 40 to 50 hours of fermentation, ionic copper in amounts between about 5 and about 200 parts per million parts of fermentation medium.

3. A process in accordance with claim 2, wherein said copper is supplied by a copper salt soluble in said fermentation medium.

4. A process in accordance with claim 3, wherein said copper salt is selected from the group consisting of cupric sulfate, cupric nitrate, cuprous chloride, cupric chloride, cuprous cyanide, cuprous iodide, cupric carbonate, and cupric acetate.

5. A method of reviving citric acid production with *Aspergillus niger* in a submerged fermentation medium having further acid production inhibited by penicillia development therein, which method comprises incorporating in said medium ionic copper, the proportion of said copper being between about 5 and about 200 parts thereof per million parts of said medium.

References Cited in the file of this patent

UNITED STATES PATENTS 2,353,771 Szucs _____ July 18, 1944
2,364,701 Eisenman et al. _____ Dec. 12, 1944

OTHER REFERENCES

The Botanical Review by J. W. Foster, 5 No. 4, April 1939 (pp. 208–210, 229–230).

J.Bact. 54, August 1947, pp. 161 to 167.

Industrial Microbiology by Prescott et al., 2nd ed., McGraw-Hill Book Co. Inc., New York, 1949 (p. 576).

Industrial Fermentation by Underkofler et al., vol. I, Chemical Publ. Co. Inc., New York, 1954 (pp. 427 and 428).